May 22, 1951 N. DESIRELLO 2,554,243
OPTICAL DEVICE FOR RESOLVING, RECOMBINING, MIXING,
SHOWING AND COMPARING LIGHT RAYS BY MEANS
OF DISPERSION PRISMS

Filed Sept. 11, 1946 3 Sheets-Sheet 1

INVENTOR
NARCISO DESIRELLO
BY
ATTORNEY

INVENTOR
NARCISO DESIRELLO
ATTORNEY

May 22, 1951 N. DESIRELLO 2,554,243
OPTICAL DEVICE FOR RESOLVING, RECOMBINING, MIXING,
SHOWING AND COMPARING LIGHT RAYS BY MEANS
OF DISPERSION PRISMS

Filed Sept. 11, 1946 3 Sheets-Sheet 3

INVENTOR
NARCISO DESIRELLO
BY
ATTORNEY

Patented May 22, 1951

2,554,243

UNITED STATES PATENT OFFICE 2,554,243

OPTICAL DEVICE FOR RESOLVING, RE-COMBINING, MIXING, SHOWING, AND COMPARING LIGHT RAYS BY MEANS OF DISPERSION PRISMS

Narciso Desirello, Genoa-Rivarolo, Italy

Application September 11, 1946, Serial No. 696,100
In Italy August 21, 1945

Section 1, Public Law 690, August 8, 1946
Patent expires August 21, 1965

7 Claims. (Cl. 88—14)

This invention relates to an optical device for resolving, mixing, showing and comparing light rays.

This device, which will be referred to hereinafter as "optical color tonalizer" is substantially based on the use of composite dispersion prism members, combined with other devices for intercepting at will any of the elementary light rays, pencils or bundles and for combining any of the bundles of light rays for a number of purposes as will be seen from the following specification.

In order that the invention may be readily understood, reference is made to the accompanying drawings, in which.

Figure 1:
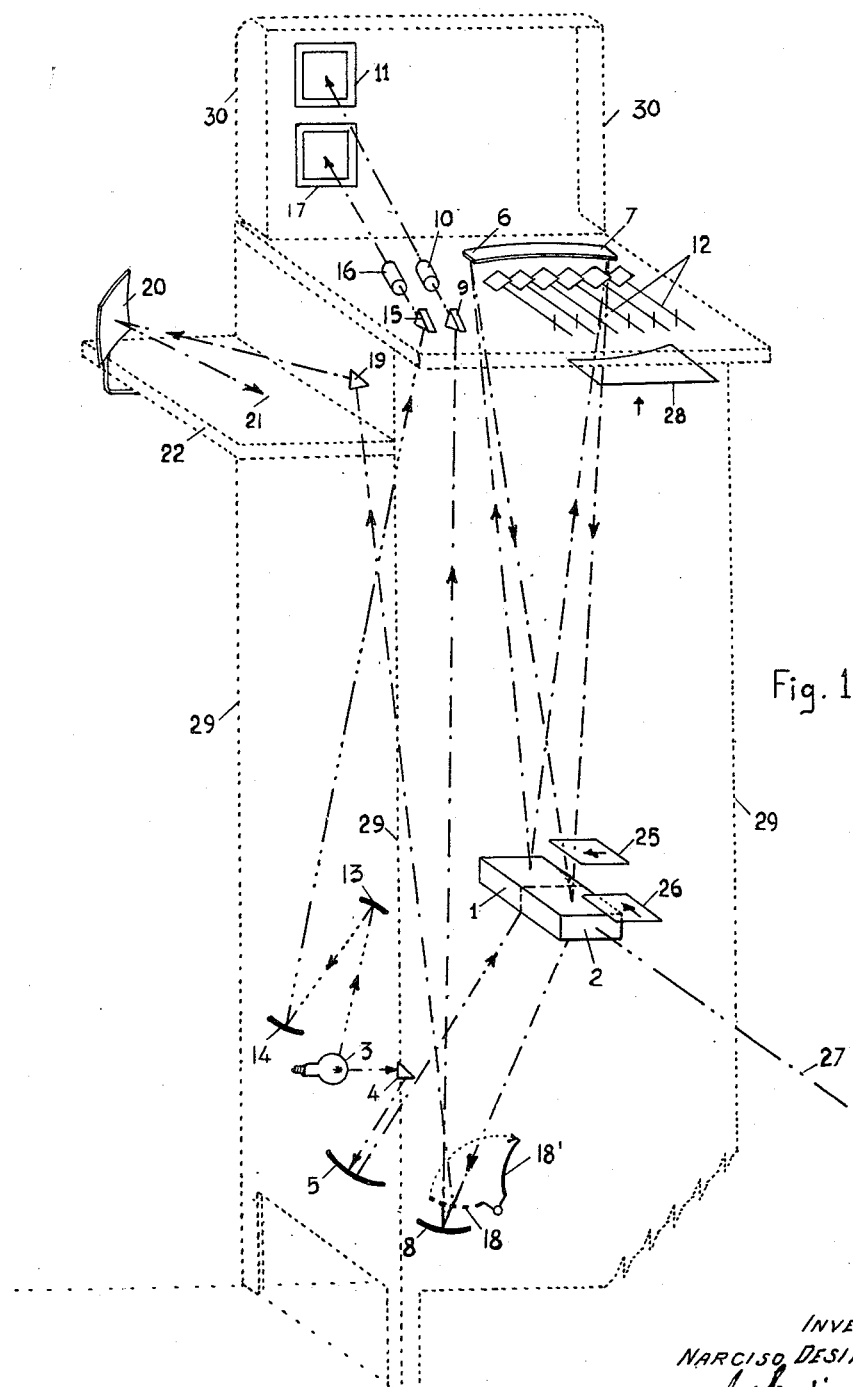
Figure 1 is a diagrammatic view in perspective of an embodiment of an optical device in accordance with the present invention.

Referring now to the accompanying drawings, specifically to Figure 1, the present invention comprises two composite prism members 1 and 2 possessing a large surface of entrance of aperture and large dispersion, an intense source of white light 3, which is regulated to define a narrow and relatively long beam, which, by means of reflecting prism 4 and a mirror 5 is directed in a parallel bundle of light rays against the first face of prism 1, where is it dispersed into its component colors and is emitted from the second face which is provided with a lens, so as to form the spectrum of colors on mirror 6—7.

From this spectrum mirror 6—7 the single colors from red to violet are reflected to the second composite prism member 2, by which they are re-composed by inverted dispersion into a parallel bundle and from which they pass to a mirror 8 that is formed upon a reflecting prism 9 which is of special construction, as will be seen hereinafter. From the prism 9, the light rays are simultaneously projected through an objective 10 and onto a white screen 11, which is thus lighted by a combination of all component colors, i. e. by a white light.

Figure 6:
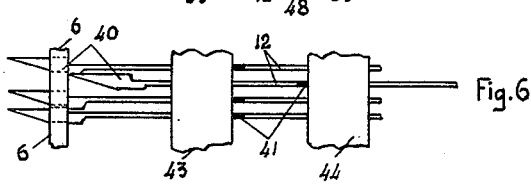

Shutters 12 (twenty in number) can be shifted in front of spectrum mirror 6—7. These shutters have an interception portion of pointed shape, or decreasing sectional shape, inclined with regard to the plane of the spectrum mirror 6—7 as may be seen in Fig. 6. Each of these shutters is supported by a guide rod, made as an extension of the interception portion, and slides within parallel equidistant grooves of a stationary supporting plate 39. When all of these shutters are moved in front of the spectrum mirror 6—7 it is completely blocked off and, as these shutters are inclined and black in color, there is no reflection of light so that no light reaches the screen 11.

Thus, by shifting any of the shutters so as to allow the corresponding light bundle to impinge against the mirror 6—7, only the bundles of light rays corresponding to the shutters in opened position will be projected to the screen 11 and, therefore, the light projected thereon will be always that of any single shutter in opened position, or the combination of any number of shutters in such position. Consequently, by providing twenty of these shutters 12 (of which only six are shown on the drawing) it is possible to selectively project on the screen 11 any one of the twenty colors into which the spectrum may be decomposed, as well as combinations of such component colors.

The number of twenty pure colors has been selected in view of the fact that the light interval between 4000 and 8000 Angstroms corresponds to one octave and is geometrically divided into twenty-four parts, for whose values twenty-four pure harmonic colors are obtained and which are analogous to the harmonic scale of sound, whose octaves are geometrically divided into 12 parts. But as the visibility of the outer colors of the light octave is small, these colors can be omitted and thus leave twenty colors which can be utilised. The above-mentioned division should of course be approved by an International commission which could conveniently adopt a different division ventesimal (that is to say, double-decimal).

As shutters 12 (Fig. 13) are constructed with the closing surface 40 so as not only to intercept or pass their respective color, but can control the five intensities by means of a control projection which can be shifted on a scale 58, it is possible to combine with each other not only twenty colors, but one hundred. Therefore, it is possible to obtain on the screen 11, one each time, innumerable colors, which are perfectly defined both as to number of pure component colors and as to intensity by means of scale 58, Fig. 13.

Figure 13:
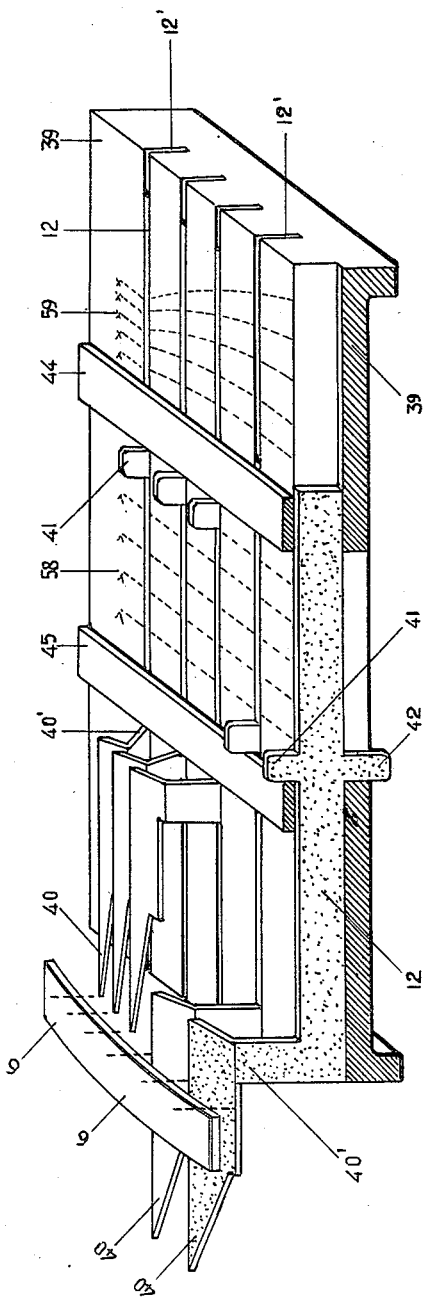
Figure 13 represents schematically and partially the shutter plate for the control of the colors; these shutters for simplicity are shown in five instead of twenty.

As on the scale 59, Fig. 13, travel the ends of the valve rods 12, these ends will form with their positions the diagram of a color which diagram as the scale 59 is all covered with a transparent Celluloid sheet, not visible on the drawing, can be traced in a few seconds on a rectangle of transparent paper on which is stamped the scale 58.

A color manufacturer can thus build up as it will be seen in connection with the sample carrier 17 a collection of diagrams of colors which can be reproduced at any time on the optical apparatus so that these diagrams with the optical apparatus will substitute the normal color samples.

If it is desired to measure, by comparison, a determined colored sample, the white light of source 3 might be simultaneously collected in part by a mirror 13, which reflects the collected light same against a mirror 14 which, in turn, focuses said light on a prism 15 from which, by means of an objective lens 16 it is projected on the supporting frame 17. By fastening the colored sample in frame 17, it will be illuminated by a white light to present its true color for comparison with the color obtained on screen 11 by means of shutters 12 and for determining and measuring exactly the color of the sample by a scale associated with the shutters 12 (see scale 58 of Fig. 13).

It may be desired to employ the pure colors of the device or their combinations, for illuminating the object carrier of a microscope. In this case, the device may include a mirror 18 which, by revolving about a pivot, can be moved from rest position 18' to operating position 18—in front of the mirror 8. Therefore, that the colors emitting from prism 2, instead of travelling the usual path, are focussed on a special prism 19 and then collected by mirror 20 which reflects them in the zone 21 where the microscope mirror (not shown) may be fitted and supported by a bracket 22. In this instance the device acts as optic filter for the illumination of a microscope.

If desired in this operation to increase the purity of the color, it will be sufficient to dispose before prism 19—where the focus of the light source is formed, and which constitutes the so-called spectroscopic slit—a diagram having a slit the width of which can be a half or a third part, and so on of said spectroscopic slit, in order to have a color of double, or triple or multiple purity.

Figure 14:
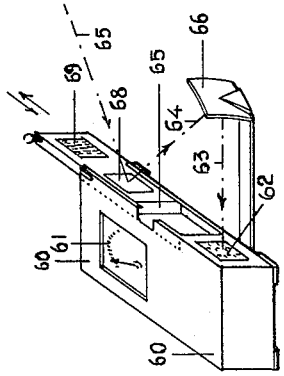
Figure 14 represents a foto-electric cell constituting a movable device with a small movable frame 67 and converging mirror 66.

The focus 21 of mirror 20 may also be employed for analytically measuring colors. For this purpose (see Fig. 14) a box 60 is employed containing a movable frame 67 carrying on one part 69 the color to be measured and on the other part 68 a sample white surface, and a mirror 66 for collecting the reflected light and projecting same against a graduated photo-electric cell 62 with scale 61.

Then, for each pure color of the apparatus, the indication of the cell for the white sample and for the colored sample are detected and measured and the whole of these relations gives the absolute diagram of the color with regard to its whiteness.

In the case of transparent liquid samples, a like device is employed but comprising a parallelepipedal container for a very transparent liquid serving as comparison liquid and a parallelepipedal container for the colored transparent liquid. The light from the apparatus, after having traversed the liquid of both parallelepipedal containers, comes to the graduated photo-electric cell, from which the relations are obtained for drawing the diagram.

The focus 21 of mirror 20 may also be employed for analytically measuring colors, and the apparatus may be adapted for this purpose by mounting shutters 25 and 26 in front of the prisms 1 and 2 for movement to intercept more or less, the ray bundles passing to said prisms. The shutter 25 may serve for controlling the light to provide an appropriate quantity to be measured by the photo-cell and the intensity of light can be measured by the scale with which the shutter 26 is provided. In the case as shown, the apparatus works as analytical universal colorimeter.

As indicated in Fig. 1, the hereinbefore described optical elements may all be mounted on a common stirrup or support, with the exception of prisms 1 and 2 and mirror 6—7, and may be rotatable about an axis 27 in order to correct variations of the optical axis of the colors which are caused by temperature.

When very pure colors are required, as for a microscope filter, and when colors other than those of the harmonic scale should be employed, it is sufficient to rotate slightly a screw which controls the above-mentioned stirrup for the correction of the temperature and to follow the indications of an adapted scale for obtaining the intermediate colors.

The hereinbefore apparatus, as diagrammatically shown, is adapted to measure color which is illuminated by artificial light, however, it may be desired to have the color by daylight. This may be effected Fig. 13 by means of a supplementary scale 59 in front of the shutter-controlling scale 58, on which indications are given by the ends of the shutters. The scale 58 is provided with grooves 12' (five for simplicity of illustration instead of twenty) in which valve rods 12 are slidable. These valve rods each carry a support 40' on which are mounted black opaque shutters or valves 40. These valves 40 are pointed and movable under the mirror 6—6 on the spectrum to graduate the light. The central buttons 41 of the valves travel in relation to the scale 58 while at the right the ends of the rods 12 travel in relation to the scale 59. Scale 59 does not comprise straight parallel lines, but is provided with particularly shaped curves, so that by shifting the shutter buttons 41 in relation to the indication of the first scale 58, the reading on the second scale 59 corresponds automatically to the corresponding measurement by sun light.

Furthermore, it may be necessary to obtain a light, for projecting the colors on the screen 11, which corresponds to white daylight. To accomplish this, a template 28 may be positioned adjacent the shutters 12 to cooperate with certain of the projections thereof to reduce the apertures therebetween, particularly those at the red end of the spectrum to the amount necessary for attaining the required result. In this case the apparatus provides the necessary daylight for judging a determined color, regardless of surrounding light conditions.

The apparatus hereinbefore described may be contained in a cabinet 29 provided with a cover 30, as indicated in dotted lines in Fig. 1. This apparatus may be also employed for artistical purposes, as for instance, illuminating drawings on the screen 11 controlling the effects by the different colors thereon. In addition, photographic transparencies may be placed adjacent the prism 9 to be projected on the screen 11.

Figure 2:
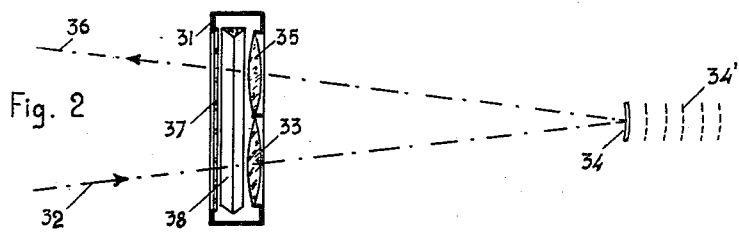
Figure 2 is a diagrammatic cross-sectional view taken vertically through the optical axis of the improved composite prism members.
Figure 3:
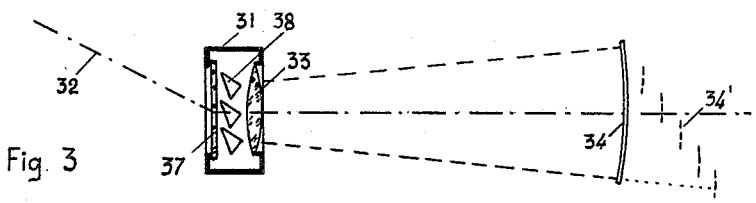
Figure 3 is a diagrammatic cross-sectional view taken horizontally through the optical axis of the improved composite prism members.
Figures 4, 5:
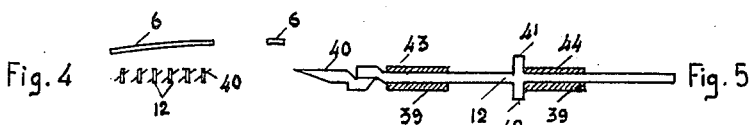
Figures 4 to 6 show respectively in transverse cross section, in longitudinal cross section and in plan view the interception valves or shutters of the device.

The optical dispersion prism device is shown in vertical section in Figure 2 and in a horizontal sectional view in Figure 3. This prism device comprises two composite partially liquid prisms constituted in series-parallel. The meaning of the term series-parallel will appear later on. These composite prisms however are preferably arranged in a single partially metallic container 31 in which the light enters along the axis 32, traverses the prism corresponding to the prism 1 and which includes the lens 33. This prism generates the spectrum on a single concave mirror 34 instead of several mirrors 34', five being shown, which would be necessary in the event that an achromatic lens is not used. The mirror 34 corresponds to the spectrum mirror 6—7, and reflects all of the colors through the second liquid prism corresponding to the prism 2 and which includes the lens 35, this second prism generating a parallel united light bundle along the axis 36.

The liquid prism comprises a metallic container 31 provided at one side with two approximately square apertures which are closed by lenses 33 and 35 and at the opposite side with a rectangular aperture which is closed by a single glass plate 37. The container is filled with a liquid having a high optical dispersion and a number of prisms 38, three being shown, are mounted vertically in the container and immersed in said liquid. These prisms 38 comprise glass having a low optical dispersion. The prisms 38 are all arranged in like manner in the container and equally spaced so that each prism 38 constitutes together with the liquid on either side toward the glass plate 37 and the lens 33, respectively, two liquid prisms acting in series therewith, thus producing a great dispersion of the spectrum in 34. Now, as a number of such prisms 38 are provided, it necessarily follows that the composite liquid prism comprises a parallel-series prism and the container encloses two of such prism members superposed one of which decomposes for dispersion the white light, while the other reverses the action of the first one and recomposes for dispersion the light.

The unic mirror 34 with unic convergence, instead of numerous mirrors having different foci and therefore different convergences, constitutes a novelty for the present system.

It is apparent that due to the inner curvature of lenses 33 and 35 it is possible to obtain together with the liquid of the prism two achromatic lenses adapted to rectify the spectrum.

Another feature of the invention resides in the shutters 12, in Fig. 1, and which preferably correspond to the constructions shown in detail in Figs. 4 to 6 and 13. The shutters 12 comprise shutter or light interception portions 40 which are pointed or progressively decrease in cross-section, and supporting and actuating rods which are slidably supported by spaced cross-bars or plates 39.

The shutters 12 include an upper projection 41 forming a hand control and a lower projection 42 forming a stop for cooperating with the supports 39 or the solar template 28, when the latter is operatively positioned. Spaced cross pieces 43 and 44 overlie the supports 39 and cooperate with the projections 41 and 42 to limit the shifting of the shutters during their normal operation.

The shutter portions 40, as previously stated, are in a plane parallel to the mirror 6 and are pointed or inclined with respect to their axes, so that by shifting the shutters longitudinally of themselves, and transversely of the spectrum mirror 6, the corresponding color pencil may be selectively intercepted, thus totally intercepting the component color or passing it in one of its five intensities. The shutter rods or stems project beyond the supports 39 to cooperate with a scale 59, Fig. 13, to give indications corresponding to the stroke of the shutter on the scale, or on the auxiliary daylight scale. A further novel feature of the tonalizer of the present invention resides in the optical focal tube, transformer of focus and mixer of light, which device will be referred to hereinafter simply as optical focal tube, which will be described hereinafter. Referring to Fig. 1, it is seen that the image of the light source 3 is formed in the focus on the prism 9, which for spectroscopic exigencies, is of rectangular shape. On the other hand, the screen 11 has a square shape, which is very different from said image of the light source 3, and, consequently, the conjugated focus on the prism 9 should be square. It is therefore desirable to provide, in conjunction with the turning prism 9, an optical means transforming the rectangular image to a square image and having the proper rectified focal dimension conjugated to that of the screen 11.

Figure 7:
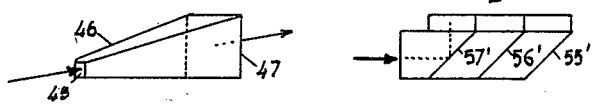
Figure 7 is a diagrammatic view in perspective of an optical focal transformer of focus and light mixer.

This means is an optical focal tube which is illustrated schematically in Fig. 7 and which may comprise an elongated glass frustum of a cone including a first face 45 which has a focal dimension similar to that of the white light source 3, side faces 46, and a second face 47 which is square, with the axis and the conjugated dimension regulated in accordance with the focus of the objective 10 and as required by screen 11. The optical means is positioned so that the focus of the converging mirror 8 corresponds to the first face 45. The light upon entrance through the first face 45, does not expand into the whole cone aperture, but is reflected, possibly by total reflection, on the side faces 46 and then deflected and completely mixed as it is emitted from the second face 47.

The use of this optical focal tube produces a mixed light or selected color on screen 11 instead of a distorted and disagreeable image of the light source 3, or of a band of spectral light which would otherwise be produced because of the use of many mirrors and of two foci. Without the focal tube, the tonality of a projected color would be gradually varied from one side to the other. Besides if the focus mixer would not exist, a certain color, if the corresponding shutters were not entirely open, would give on the screen 11 some angles which are well illuminated and some angles of little or no illumination. In particular cases, the light may be emitted from lateral portions of the focal tube.

Figure 8:
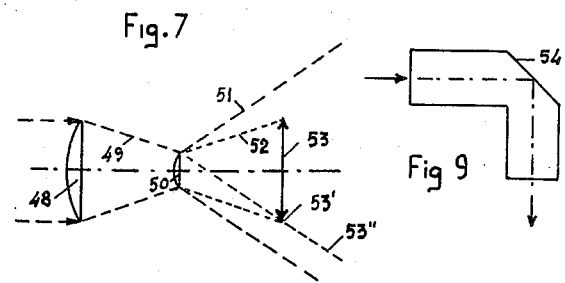
Figure 8 shows schematically a detail of part of a device comprising a lens placed in a focus for partially reducing the cone aperture of the leaving light.

The optic focal tube just described possesses the characteristic that it follows the law of the apertures, which is characteristic of lenses, that is, the aperture of the light bundle which enters the focal tube and the aperture of the light bundle emitting therefrom would provide a lens substituted for the focal tube and capable of producing the second focus in departing from the first focus. This is without counting the mixture and supposing that the two foci are of similar form between each other. However, it may be desirable to avoid an increase of the aperture which is as small as possible. These ends may be attained by suitably dimensioning the converging curvatures of both the inlet and outlet surfaces of the optical focal tube. For example, referring to Fig. 8, when a lens 48 focuses the light rays 49 at 50, the light bundle projecting from this focus is not equal and does not possess the same angle by the opening as the incoming bundle, but it is widened, thus generating an increase of aperture 51. If, however, a lens of suitable convergency is mounted in the focus 50, the outcoming bundle possesses the same aperture 52 or even a smaller aperture than the incoming light bundle 49. Therefore, the lens 50 may be termed a focal lens for reducing the aperture of the leaving light bundle or more simply focal lens.

The optical focal tube may incorporate the above-described focal aperture reducing lens and, consequently, may be termed a "composite optical focal tube." Generally, the inlet and outlet faces of the focal tube are perpendicular to its axis; however, the composite optical mixer may be completely or in part hollow, with specular side surfaces. If it is hollow, it may receive a circulation of cooling liquid. The optical focal tube is reversible, as it not only transforms the first focus into the second, but effects also the reverse transformation. The composite optical focal tube is advantageous as it has a greater luminous capacity.

Figures 10, 11:
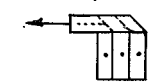
Figures 9 to 12 are diagrammatic plan views of modified embodiments of optical focal transformer of focus and light mixer.
Figure 9:
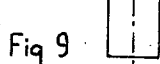
Figure 12:
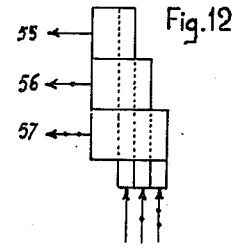

The focal tube may incorporate the turning prism 9 or for other reasons deflect the rays one or more times. One modification is shown in Fig. 9 wherein the light bundle is deflected at 90° by a reflecting face 54. It must be noted that the mixer of Fig. 9 can be imagined as constituted by two mixers, one horizontal, the other vertical, united by a prism of reflection and working in series. A plurality of such prisms may be combined as a single unit as shown in Figs. 10, 11 and 12. In Fig. 10 as a side view, Fig. 11 as an end view and Fig. 12 as a top view, are illustrated a combination of three prisms capable of transforming a square focus into a rectangular one.

In Fig. 10 the three specular faces 55', 56' and 57' are inclined at 45° and deflect the light rays at 90° and three other deflecting faces inclined at 45°, may be seen in Fig. 11, for turning the light rays at 90°. In Fig. 12 three axes are shown which indicate the direction of the light inlet into the three elementary prisms, while the three outlet axes are shown at 55, 56 and 57. As it appears from the drawing, the single focal tubes of the unit are all twisted twice, but not in the same manner. In the focal tube as described which can be considered as formed of focal mixers working in parallel, it may be seen that the incoming light bundle is not coaxial, but perpendicular to the outcoming bundle. In this optical focal tube it is not necessary that the first focus be continuous, but it might be constituted of different detached zones, or of different focus.

In the composite optical focal tube it is not necessary that the first focus be continuous, but it might be constituted of different detached zones, or of different focuses. Just as the optical focal tube may be arranged in parallel, they also may be arranged in series, in which instance, in the case of two focal tubes, the second focal tube collects more or less totally the light bundle emitted by the first one. Obviously, this optical transformer and mixer may preferably be used in conjunction with prisms or focuses 15 and 19 as well as with the prism or focus 9 as described.

The operation of the optic focal tube within the color tonalizer is as follows:

An optical focal tube and deflector is placed into the focus 9 of mirror 8 and a further light deflector is placed into the focus 19 of mirror 18 and another focal tube and deflector is placed in correspondence of focus 15 of mirror 14. As however it is desirable to illuminate screen 11 not only with a square surface for the color tonalizer but also with larger rectangular surfaces for artistical purposes, instead of fitting a single focal tube in correspondence of focus 9, it is convenient to fit three of such mixers, one of which serves for the illumination of the usual screen and the other two for the artistical illumination of rectangular pictures. These three focal tubes might be carried by a suitable lever or by a suitable rotating drum, having three definite working positions. In the case of deflecting focal tubes by means of specular faces, and particularly of focal tubes possessing wide apertures, it is not convenient that the axis be bent along the focal tube. It is preferable to bend the axis ahead of the inlet face or behind the outlet face. In the composite optical focal tube a more advantageous luminous capacity may be obtained.

A further feature of the invention comprises a buffer lever, not shown, which may be mounted in front of the shutters 12, and by means of which it is possible to print on suitably traced paper, by means of carbon paper, the position of the projections 42, or other suitable projections, carried by the shutters, thus obtaining the diagram of a predetermined composite color.

A further feature of the invention resides in the construction of the screen 11 for obtaining the greatest efficiency. This screen may be either the usual white screen, or it may constitute a roughened glass provided with a reflecting layer at its back surface, as a mirror. Moreover, in order to increase the unidirectional effect, a plano-convex lens may be employed which has its plane surface roughened and its curved surface mirror-plated. Furthermore, the screen may comprise different suitably shaped plane or converging members arranged adjacent to each other.

Generally speaking, the optical system according to the present invention as well as the sets of composite prism elements may be adapted for artistic, commercial, industrial, physiological, chemical, physical, electrical, catalytical uses and so on.

Although certain specific embodiments of the invention have been shown and described, it is obvious that many modifications thereof are possible. The invention, therefore, is not to be restricted except in so far as is necessitated by the prior art and by the spirit of the appended claims.

I claim:

1. An optical device comprising: a source of white light, means for projecting the white light emitted from this source in parallel rays; a prism having a large dispersion and a large aperture for receiving and dispersing said parallel rays of white light into the spectral colors, shutters adjacent to the spectrum and covering in its totality all spectrum adapted to intercept in a controllable measure, up to total interception, the colors of the device; means for concentrating the selected spectral colors which have not been intercepted upon a second prism having a large dispersion and a large aperture, like the first mentioned prism, but working in opposite direction, so as to receive the said selected spectral colors and deflect same in a parallel bundle; means for concentrating said bundle of rays in a focus exactly situated upon the face of entrance of optical focal tube having inside reflecting walls, which optical tube at the outlet forms a focal section of determined form and orientation and an objective for receiving the rays of said focus and project same in a predetermined field.

2. An optical device according to claim 1, in which the means for concentrating the spectral colors on the second-named prism consist of an unic converging mirror.

3. An optical device according to claim 1, in which the optical focal tube consists of an elongated body, defined by inwardly reflecting walls and transparent interior and eventually optically bent, such object supplied with two end faces, of which the first face is alike to the focus of the light in arrival, the second end face of outlet alike to the transformed and mixed focus which has to be obtained and the reflecting lateral surfaces of the object in condition to prevent lateral outlet of the light; each one of the two faces of entrance and outlet forming a lens, totally two lens equivalent in its totality to a focal lens which if placed in the focus without a focal optical tube is adapted to sensibly reduce the aperture of the leaving light bundle.

4. In an optical device according to claim 1 characterized in this that the optical focal tube of focus and light mixer is constituted of elementary focal tubes working in parallel.

5. In an optical device according to claim 1 characterized in this that the optical focal tube of focus and light mixer is constituted of elementary focal tubes working in series.

6. An optical device according to claim 1, in which the said shutters comprise a rectangular portion having such an area as to possibly intercept completely the color bundle controlled thereby and a substantially triangular portion intercepting said color bundles only partially, means being provided for shifting said shutters so as to intercept the whole or any required fraction of the said color bundles; said shutters being carried by parallel equally spaced shiftable rods provided with control knobs forming a kind of keyboard, means being provided for detecting the amount of shifting of said rods and the corresponding shutter position and the corresponding intensity of the colors controlled thereby.

7. An optical device according to claim 1, in which said means for detecting the amount of shifting of the said rods comprising a first scale arranged under said rods, a second scale fitted adjacent the first one, covered by a removable transparent sheet and on which the curve indicating the composition of the composite light issuing from the optical device in relative amounts of simple colors may be drawn by marking the relative positions of the knobs and constructing a curve through said markings, and a curve, permanently drawn on said second scale under said removable transparent sheet, on which the curve indicating the amounts of the same elementary colors in the solar light is permanently drawn, which permits of obtaining a light of like composition as that of the sun by the use of the said optical device, the whole for the purposes as set forth.

NARCISO DESIRELLO.

REFERENCES CITED

The following references are of record in the file of this patent:

UNITED STATES PATENTS

| Number | Name | Date |
| --- | --- | --- |
| 1,458,826 | Janovjak | June 12, 1923 |
| 1,840,476 | Twyman | Jan. 12, 1932 |
| 1,858,361 | Desirello | May 17, 1932 |
| 1,971,737 | Troland | Aug. 28, 1934 |
| 2,077,102 | Fardon | Apr. 13, 1937 |
| 2,122,689 | Jones | July 5, 1938 |
| 2,193,606 | Ubrey | Mar. 12, 1940 |
| 2,206,521 | Akker et al. | July 2, 1940 |
| 2,330,877 | Fleisher | Oct. 5, 1943 |
| 2,339,780 | Huitt | Jan. 25, 1944 |
| 2,443,258 | Lindenblad | June 15, 1948 |

FOREIGN PATENTS

| Number | Country | Date |
| --- | --- | --- |
| 425,153 | Italy | Sept. 13, 1947 |